(12) United States Patent
Lee

(10) Patent No.: US 7,122,992 B2
(45) Date of Patent: Oct. 17, 2006

(54) INVERTER SYSTEM FOR DRIVING INDUCTION MOTOR

(75) Inventor: Jeoung-Pyo Lee, Gyeonggi-Do (KR)

(73) Assignee: LS Industrial Systems Co., Ltd., Seoul (KR)

( * ) Notice: Subject to any disclaimer, the term of this patent is extended or adjusted under 35 U.S.C. 154(b) by 0 days.

(21) Appl. No.: 11/295,565

(22) Filed: Dec. 7, 2005

(65) Prior Publication Data
US 2006/0119311 A1   Jun. 8, 2006

(30) Foreign Application Priority Data
Dec. 8, 2004   (JP)   ............... 10-2004-0103148

(51) Int. Cl.
*H02P 27/06* (2006.01)
(52) U.S. Cl. ............... 318/801; 318/803; 318/812; 363/37
(58) Field of Classification Search ............... 318/727, 318/767, 798–803, 805, 808, 810–812; 363/34, 363/37, 40, 41
See application file for complete search history.

(56) References Cited

U.S. PATENT DOCUMENTS

| 5,070,290 | A | * | 12/1991 | Iwasa et al. | ............... 318/758 |
| 5,475,293 | A | * | 12/1995 | Sakai et al. | ............... 318/802 |
| 5,731,681 | A | * | 3/1998 | Inaniwa et al. | ............... 318/729 |
| 5,959,430 | A | * | 9/1999 | Yuki et al. | ............... 318/805 |
| 6,058,036 | A | * | 5/2000 | Endo et al. | ............... 363/98 |

\* cited by examiner

*Primary Examiner*—Bentsu Ro
(74) *Attorney, Agent, or Firm*—Greenblum & Bernstein P.L.C.

(57) ABSTRACT

An inverter system for driving an induction motor is disclosed. The inverter system for driving an induction motor comprises: a rectifying circuit for rectifying a three-phase AC voltage and outputting the same; a smoothing circuit for smoothing the rectified voltage and outputting the same; a controller for detecting a DC link voltage of the smoothing circuit, determining a power failure mode, a normal mode or a power restoration mode according to the detected DC link voltage and predetermined elapsed time, and outputting a voltage pulse signal according to the mode; and an inverter for converting the DC voltage outputted from the smoothing circuit into an AC voltage of variable frequency and variable voltage according to the voltage outputted from the controller and outputting the converted AC voltage in order to drive the induction motor.

3 Claims, 5 Drawing Sheets

INVERTER SYSTEM FOR DRIVING INDUCTION MOTOR

BACKGROUND OF THE INVENTION

1. Field of the Invention

The present invention relates to an inverter system for driving an induction motor, and more particularly, to an inverter system with an improved control of an induction motor at the time of a power failure and restoration.

2. Description of the Related Art

In a motor system drive-controlled by an inverter system, generally, the motor has the characteristic of a rotating load, and thus a mechanical system of the motor stores an inertial energy. The inertial energy E that the mechanical system has is as in [Formula 1]:

$$E = \frac{1}{2} J * \omega^2 [J] \quad \text{[Formula 1]}$$

Wherein ω represents the rotation angle speed of a rotating body, and J represents an inertial moment.

The construction of a general inverter system for driving an induction motor will now be described with reference to FIG. 1.

As depicted in FIG. 1, an induction motor system that applies a general inverter system comprises: an inverter system 10; an induction motor IM drive-controlled upon receipt of power from the inverter system 10; and a load 13 connected to the induction motor IM and driven by the induction motor IM.

The inverter system 10 converts a commercial three-phase AC voltage into a three-phase DC voltage by rectification and smoothing, and inverts this three-phase DC voltage into a three-phase AC voltage of variable frequency and variable voltage to provide it to the induction motor IM.

Then, the induction motor IM produces a torque of such magnitude as to be obtained in [Formula 2], and operates the load 13 by the produced torque.

$$T_m = J \frac{d\omega}{dt} + B\omega + T_L [Nm] \quad \text{[Formula 2]}$$

Wherein J represents an inertial moment, B represents a frictional coefficient, ω represents the rotation angle speed of a rotating body, and TL represents a load torque.

FIG. 2 is a block diagram showing a detailed construction of an inverter system according to the related art.

As depicted in FIG. 2, the inverter system according to the related art comprises: a rectifying circuit 23 for rectifying a commercial three-phase power supply 21; a smoothing circuit 25 for smoothing the pulse of the rectified DC voltage received from the rectifying circuit 23 and producing it into a direct current having a constant magnitude to provide it; an inverter 11 for receiving the DC voltage outputted from the smoothing circuit 25; a voltage detector 27 for detecting a DC link voltage from the smoothing circuit 25; and a frequency generator 29 for generating a voltage pulse signal having a target frequency according to the detected DC link voltage and outputting the generated voltage pulse signal having the frequency into the inverter 11.

Here, a DC voltage produced by rectifying and smoothing a three-phase AC voltage by a rectifying circuit and a smoothing circuit 25 is referred to as a DC link voltage.

The voltage detector 27 detects a DC link voltage from the smoothing circuit 25. And, the voltage detector 27 judges whether the detected DC link voltage is a preset low voltage. Then, the voltage detector 27 informs the frequency generator 29 of the judgment result. Here, the magnitude of the low voltage is set differently according to an input voltage of the inverter. For example, if the input voltage of the inverter is 220V, the low voltage is about 220V, and if the input voltage of the inverter is 440V, the low voltage is about 400V.

If the detected DC link voltage is not a low voltage, the frequency generator 29 outputs a voltage pulse signal of variable frequency and variable voltage according to a target speed of the motor IM into the inverter 11.

At this time, the inverter 11 is switched by the voltage pulse signal of variable frequency and variable voltage from the frequency generator 29, thus inverting the DC voltage outputted from the smoothing circuit 25 into a three-phase AC voltage and applying it to the induction motor IM.

On the other hand, if the detected DC link voltage is a low voltage (i.e., electrostatic voltage), the frequency generator 29 does not generate a voltage pulse signal of variable frequency and variable voltage according to a target speed anymore, and thus the inverter 11 is not able to apply a driving power to the induction motor IM.

If the detected DC link voltage is a low voltage (i.e., electrostatic voltage)<the induction motor IM produces a torque calculated by the torque balance equation of [Formula 2]. Because the induction motor IM has an inertial energy though it is not applied with a driving power. Therefore, the induction motor IM rotates for a predetermined time, i.e., a time for consuming the whole inertial energy with a frictional load and then stops even in a power-off state.

Meanwhile, in the case that the inverter system is normally operated, the frequency of the output voltage pulse signal of the frequency generator 29 gradually decreases and thus the speed of the induction motor IM becomes '0'.

However, in the event of an unexpected power failure, the inverter 11 does not output a driving power to the induction motor IM anymore, and the induction motor IM rotates by an inertial energy for a predetermined time and then stops.

That is, when the DC link voltage becomes below a low voltage due to a power failure, the power inputted into the inverter is cut off, and accordingly, the driving power of the induction motor is cut off. Here, the time for cutting off the output (driving power) of the inverter 11 after the DC link voltage becomes below a low voltage is determined by the amount of load and the capacitance of the capacitor of the smoothing circuit 25. For instance, in case of a constant torque load with respect to rated load, the cut-off time is 16 milliseconds, and in case of a variable torque load with respect to rated load, the cut-off time is 8 milliseconds.

However, the inverter system according to the related art has no means for storing a voltage value of the output voltage pulse signal of the frequency generator 29 finally outputted at the time of power failure. Therefore, at the time of power restoration after a temporary power failure of about 8 mSecs or 16 mSecs, the control of the inverter according to a target frequency is restarted from a start control, while the induction motor IM cannot be smoothly controlled because it rotates at a speed higher than a predetermined speed by an inertial energy.

Furthermore, in the induction motor system provided with an inverter control device according to the related art, the induction motor continues to rotate for a predetermined time even if the output of the inverter is cut off due to power failure, which may cause a problem to the safety of a user when the user accesses the induction motor system only with the perception of the inverter state (e.g., whether the inverter outputs or not).

BRIEF DESCRIPTION OF THE INVENTION

Therefore, an object of the present invention is to provide an inverter system for driving an induction motor which can smoothly and safely control the induction motor at the time of power restoration after an instantaneous power failure since it can ensure the continuity of induction motor control when an instantaneous power failure occurs due to a power accident on the induction motor system.

Another object of the present invention is to provide an inverter system for driving an induction motor which can regenerate the inertial energy of the induction motor to consume it on the inverter at the time of power failure, and can stop the operation of the inverter, with the induction motor being stopped.

To accomplish the above objects, there is provided an inverter system for driving an induction motor according to the present invention, -comprising: a rectifying circuit for rectifying an AC voltage from a three-phase AC power supply and outputting the same; a smoothing circuit being connected to the rectifying circuit and for smoothing an output voltage from the rectifying circuit to provide the same; a controller for detecting a DC link voltage of the smoothing circuit, determining a power failure mode, a normal mode or a power restoration mode according to the detected DC link voltage and time, determining the normal mode to output a voltage pulse signal according to a target frequency if the detected DC link voltage is higher than or the same as a predetermined normal reference voltage, outputting a voltage pulse signal having a voltage smaller than the voltage according to the target frequency by a regeneration bias voltage obtained by calculation if the detected DC link voltage is the same as or smaller than a predetermined electrostatic reference voltage, and outputting a voltage pulse signal according to the frequency finally outputted and stored at the time of power failure if the detected DC link voltage is higher than the predetermined electrostatic reference voltage and smaller than or the same as the normal reference voltage and when in the power restoration mode in which a predetermined power restoration time has passed; and an inverter for driving the induction motor by converting the DC voltage outputted from the smoothing circuit into an AC voltage of variable frequency and variable voltage according to the voltage pulse signal outputted from the controller.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
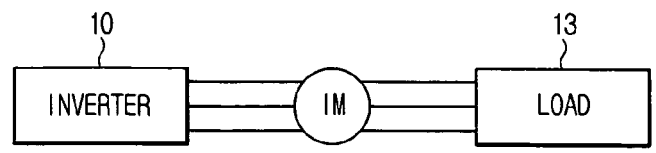
FIG. 1 is a block diagram showing the system construction of a general induction motor, load and inverter.
Figure 2:
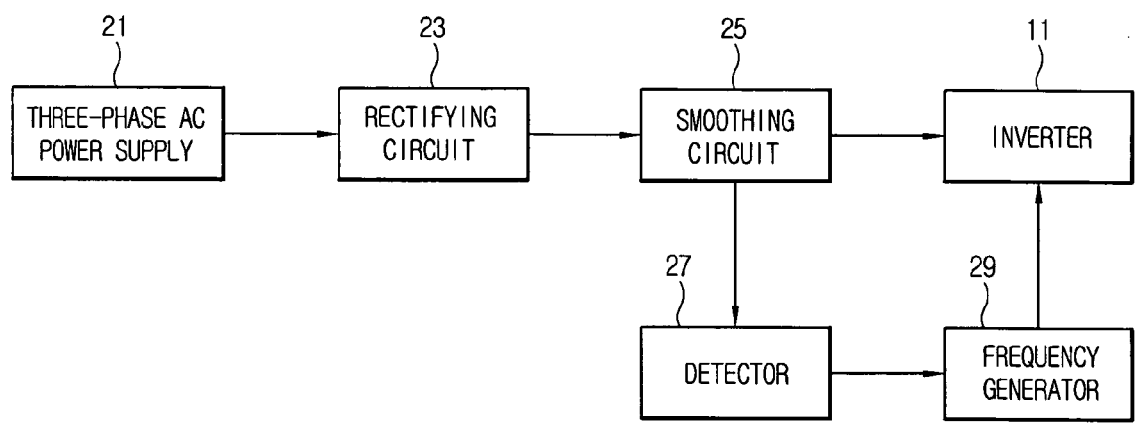
FIG. 2 is a block diagram showing one example of an inverter system for driving an induction motor according to the related art.
Figure 3:
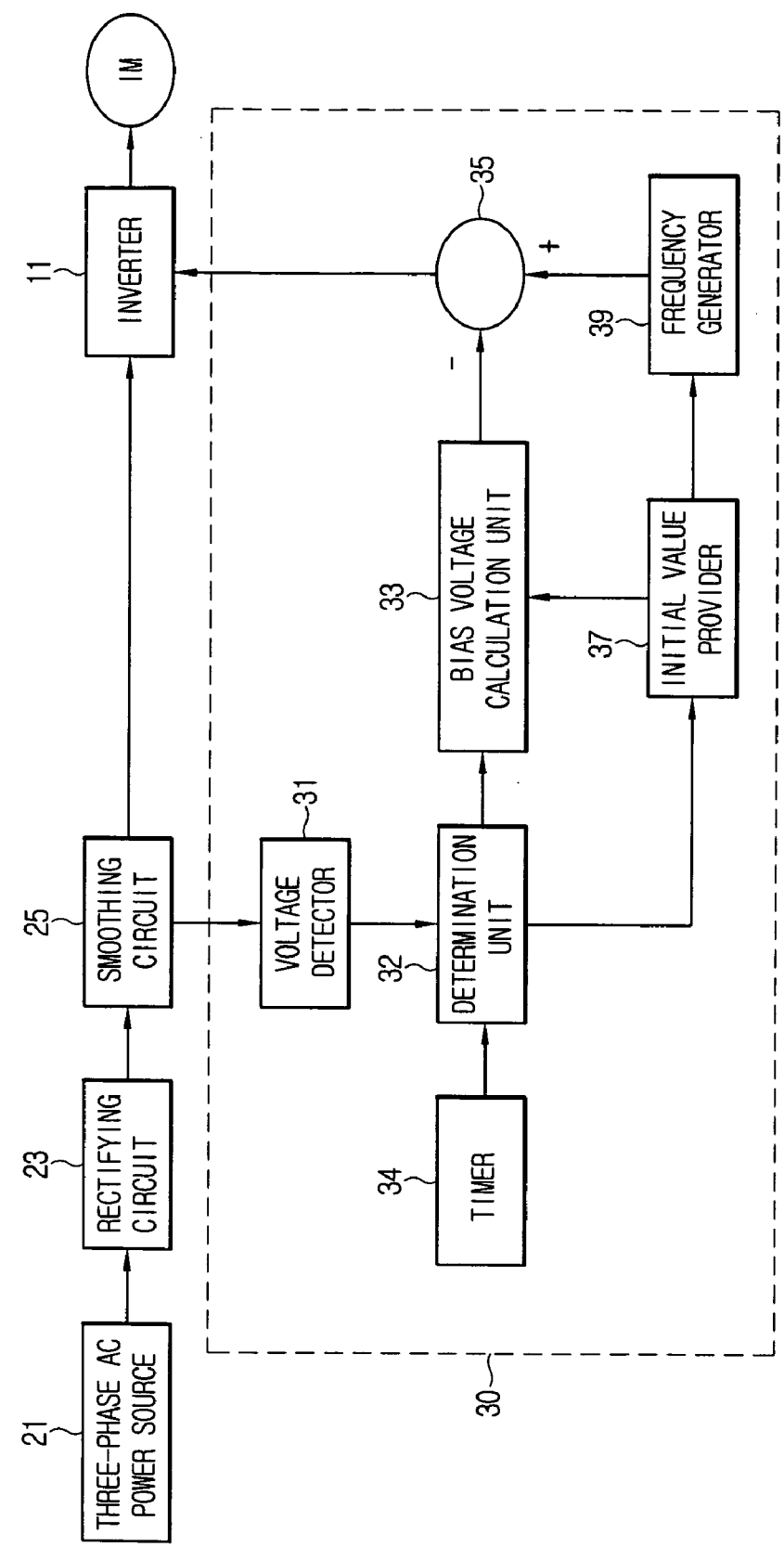
FIG. 3 is a block diagram showing an inverter system for driving an induction motor according to an embodiment of the present invention.

FIG. 3 is a block diagram showing an inverter system for driving an induction motor according to an embodiment of the present invention. Referring to FIG. 3, the construction of the present invention will now be described.

The inverter system for driving an induction motor according to the present invention comprises: a rectifying circuit 23 for rectifying an AC voltage from a three-phase AC power supply 21 and outputting the same; a smoothing circuit 25 being connected to the rectifying circuit and for smoothing an output voltage from the rectifying circuit 23 to provide the same; a controller 30 for detecting a DC link voltage of the smoothing circuit 25, determining a power failure mode, a normal mode or a power restoration mode according to the detected DC link voltage and time, determining the normal mode to output a voltage pulse signal according to a target frequency if the detected DC link voltage is higher than or the same as a predetermined normal reference voltage, outputting a voltage pulse signal having a voltage smaller than the voltage according to the target frequency by a regeneration bias voltage obtained by calculation if the detected DC link voltage is the same as or smaller than a predetermined electrostatic reference voltage, and outputting a voltage pulse signal according to the frequency finally outputted and stored at the time of power failure if the detected DC link voltage is higher than the predetermined electrostatic reference voltage and smaller than or the same as the normal reference voltage and when in the power restoration mode in which a predetermined power restoration time has passed; and an inverter 11 for driving the induction motor IM by converting the DC voltage outputted from the smoothing circuit 25 into an AC voltage of variable frequency and variable voltage according to the voltage pulse signal outputted from the controller 30.

The three-phase AC power supply 21 is a commercial AC power supply, and provides a voltage of, for example, AC 220 volts or AC 440 volts.

The rectifying circuit 23 is a common rectifying circuit comprised of a diode. The smoothing circuit may be comprised of a capacitor for smoothing a DC voltage of a pulse outputted from the rectifying circuit 23 and converting it into a smooth DC.

The inverter 11 may be comprised of a common inverter circuit provided with a pair of gate control switching devices by each phase, and switch-controlled by the voltage pulse signal from the controller 30.

Here, the controller 30 comprises: a voltage detector 31 for detecting the DC link voltage from the smoothing circuit 25 and outputting the detected DC link voltage; a mode determination unit 32 being connected to the voltage detector 31 and for determining a power failure mode, a normal mode or a power restoration mode according to the DC link voltage from the voltage detector 31 and an elapsed time; a timer 34 for providing the elapsed time to the mode determination unit 32; a frequency generator 39 for providing a voltage pulse signal according to a target frequency on the basis of a preset target frequency, acceleration time and deceleration time; a regeneration voltage calculation unit 33 for calculating a regeneration bias voltage and providing the same if the mode determination unit 32 determines a power failure mode; an initial value provider 37 for storing data of a final output voltage pulse signal of the frequency generator 39 if the mode determination unit determine the power failure mode and for providing the frequency generator 39 data of a stored, final output voltage pulse signal as an initial value at the time of power restoration if the mode determination unit determines the power restoration mode; and a subtractor for subtracting the value of the regeneration bias voltage outputted from the regeneration bias voltage calculator 33 from the voltage value of the voltage pulse signal outputted from the frequency generator 39.

Here, the voltage detector 31 may be comprised of a potential transformer for detecting both end voltages of the capacitor of the smoothing circuit 25 and providing them.

If the detected DC link voltage is larger than or the same as the normal reference voltage preset and stored, the mode determination unit 32 determines the normal mode, and if the detected DC link voltage is the same as or smaller than the electrostatic reference voltage preset and stored, it determines the power failure mode. And, if the detected DC link voltage is larger than the preset electrostatic reference voltage and smaller than or the same as the normal reference voltage and the preset power restoration time is passed, the mode termination unit 32 determines the power restoration mode. The mode determination unit 32 may be comprised of a microprocessor including a ROM (read only memory) storing a program for substantially comparing the reference voltage values and/or power restoration time and defining a command of mode determination according to the comparison result and a central processing unit processing this program.

The timer 34 may be comprised of a variety of means, such as a system clock, pulse generator and pulse counter, which are driven by the mode determination unit 32 to provide an elapsed time and substantially stored in the microprocessor.

The regeneration bias voltage calculation unit 33 will be described below in more detail with reference to FIG. 5.

The initial value provider 37 stores data of the output voltage pulse signal of the frequency generator 39, and when the mode determination unit 32 determines the power restoration mode, it provide data finally stored as the data of the output voltage pulse signal of the frequency generator 39 as an initial value at the time of power restoration to the frequency generator 39 according to the command of the mode determination unit 32 when a power failure occurs.

Such a substantial configuration of the initial value provider 37 may be implemented by, for example, a RAM (random access memory), and may be implemented in such a manner to provide data of the output voltage pulse signal of the frequency generator 39 according to the command of the central processing unit by means of the program when a power failure occurs.

The frequency generator 39 may be substantially implemented by a microprocessor and a pulse generator for generating a pulse whose frequency is controlled by the microprocessor so that it can output a voltage pulse signal corresponding to a preset and stored target frequency, acceleration time and deceleration time according to a target speed of the induction motor IM.

The subtractor 35 is a means of the final step of the controller 30, which may be substantially implemented by a microprocessor, and substrates the value of a regeneration bias voltage outputted from the regeneration bias voltage calculation unit 33 from the voltage value of the voltage pulse signal outputted from the frequency generator 39 to provide the result to the inverter 11.

Hereinafter, the operation of the inverter system for driving an induction motor according to the present invention will be described in detail with reference to FIGS. 4 and 5.

The electrostatic reference voltage and normal reference voltage as explained with reference to FIG. 3 are as indicated by "B" and "D" in FIG. 4, and a voltage larger than the electrostatic reference voltage and smaller than or the same as the normal reference voltage is defined as a power restoration reference voltage and designated as reference numeral C.

Figure 4:
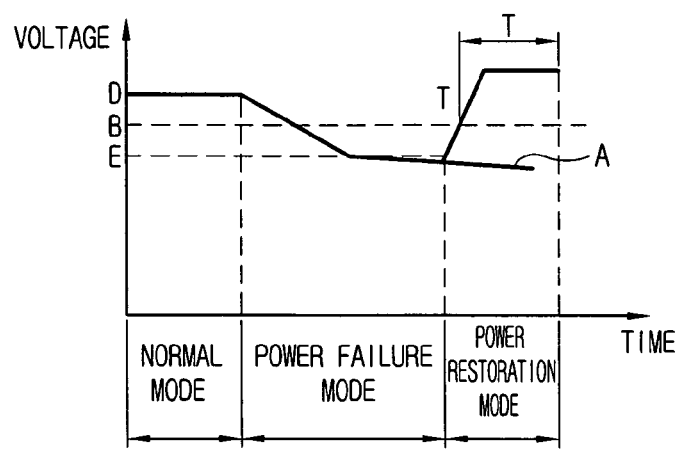
FIG. 4 is a graph showing a voltage level of a DC link voltage and a method of determining a mode according to the same according to the embodiment of the present invention.

In FIG. 4, reference numeral T indicates an elapsed time during which the DC link voltage detected by the voltage detector 31 corresponds to the restoration reference voltage C.

In FIG. 4, reference numeral E is a voltage smaller than the electrostatic reference voltage B. This voltage is a low voltage trip voltage, that is, a reference voltage at which a circuit breaker (not shown) is tripped upon sensing a low voltage to break power supplied from the three-phase DC power supply.

Reference numeral A is a virtual DC link voltage for showing that a DC link voltage detected by the voltage detector 31 ultimately decreases to zero if power failure continues.

As depicted in FIG. 4, if the detected DC link voltage is larger than or the same as a preset and stored normal reference voltage D, the mode determination unit 32 determines the normal mode, and if the detected DC link voltage is the same as or smaller than the preset and stored electrostatic reference voltage B, it determines the power failure mode. And, as depicted in FIG. 4, if the detected DC link voltage corresponds to a power restoration voltage C which is larger than the preset electrostatic reference voltage B and smaller than or the same as the normal reference voltage D, and a predetermined power restoration time is elapsed, the mode determination unit 32 determines the power restoration mode. Here, in the normal mode, the inverter system of this invention normally operates. In the power failure mode, the controller 30 subtracts a calculated regeneration bias voltage value from a voltage value according to a target frequency provided to the inverter 11, that is, from a voltage pulse signal so that the regeneration voltage (regeneration energy) of the induction motor IM rotating by inertia for a predetermined time even after a power failure can be consumed in the inverter 11. Namely, as the voltage of the inverter 11 becomes lower than the regeneration voltage of the induction motor IM, the regeneration energy of the induction motor IM moves toward the inverter 11 and is converted into an electrical energy and consumed. In the power restoration mode, the controller 30 of the inverter system according to the present invention continually restart the control of the induction motor IM according to a target frequency by using a voltage value according to a final target frequency stored at the time of power failure in the initial value provider 37, thereby ensuring the continuity of control.

A detailed construction and operation of the regeneration bias voltage calculation unit 33 will be described with reference to FIG. 5.

Figure 5:
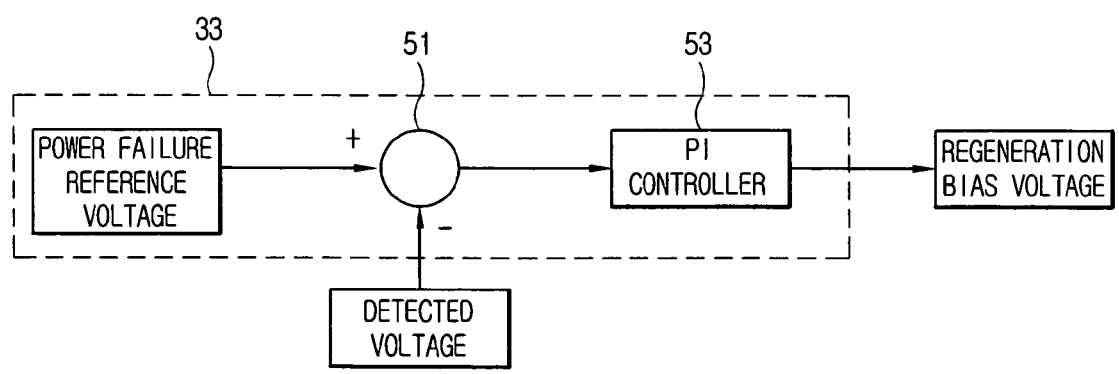
FIG. 5 is a block diagram showing the construction of a regeneration quantity calculation unit according to the present invention.

As depicted in FIG. 5, the regeneration bias voltage calculation unit 33 includes a subtractor 51 and a proportional integration (hereinafter, PI) controller 53.

The subtractor 51 outputs a difference voltage obtained by subtracting a DC link voltage detected from the voltage detector 31 from a preset electrostatic reference voltage B only when there is a signal according to the determination of the power failure mode from the mode determination unit 32. Here, the outputting of the difference voltage by the subtractor 51 only when there is a signal according to the determination of the power failure mode from the mode determination unit 32 can be realized by connecting a switch (not shown) between the mode determination unit 32 and the subtractor 51 and shutting the switch in response to a driving signal according to the determination of the power failure mode from the mode determination unit 32. Further, a software implementation is also possible, by which such a configuration and operation of the switch are processed by a central processing unit (not shown) by using a program.

The PI controller 53 is input with a difference voltage outputted from the subtractor 51, and obtains a regeneration bias voltage by proportional integration of the input difference voltage and outputs this regeneration voltage.

When a state of power supply to the induction motor system judged by the voltage detector 31 is the power failure mode, the inertial energy (refer to [Formula 1]) of the induction motor IM that does not immediately stops is regenerated by the inverter 11. That is, when the mode to the induction motor system is the power failure mode, the regeneration bias voltage calculation unit 33 outputs a regeneration bias voltage, i.e., a bias voltage greater than 0 so that inertial energy can be converted into electrical energy, biased and regenerated by the inverter 11 because of the voltage of the inverter 11 smaller than the voltage of the induction motor IM. The regeneration bias voltage outputted from the regeneration bias voltage calculation unit 33 is inputted into the subtractor 35, and the subtractor 35 subtracts the regeneration bias voltage from the voltage value of a voltage pulse signal according to a target frequency outputted from the frequency generator 39 and provide the result to the inverter 11. Thus, the voltage of the inverter 11 is lower than the voltage of the induction motor IM. Therefore, when the induction motor system is in the power failure mode, the inertial energy of the induction motor is converted into electrical energy and consumed by the inverter 11.

A control operation of the thus-constructed inverter system for driving an induction motor according to the present invention will be described in detail with reference to FIG. 6.

Figure 6:
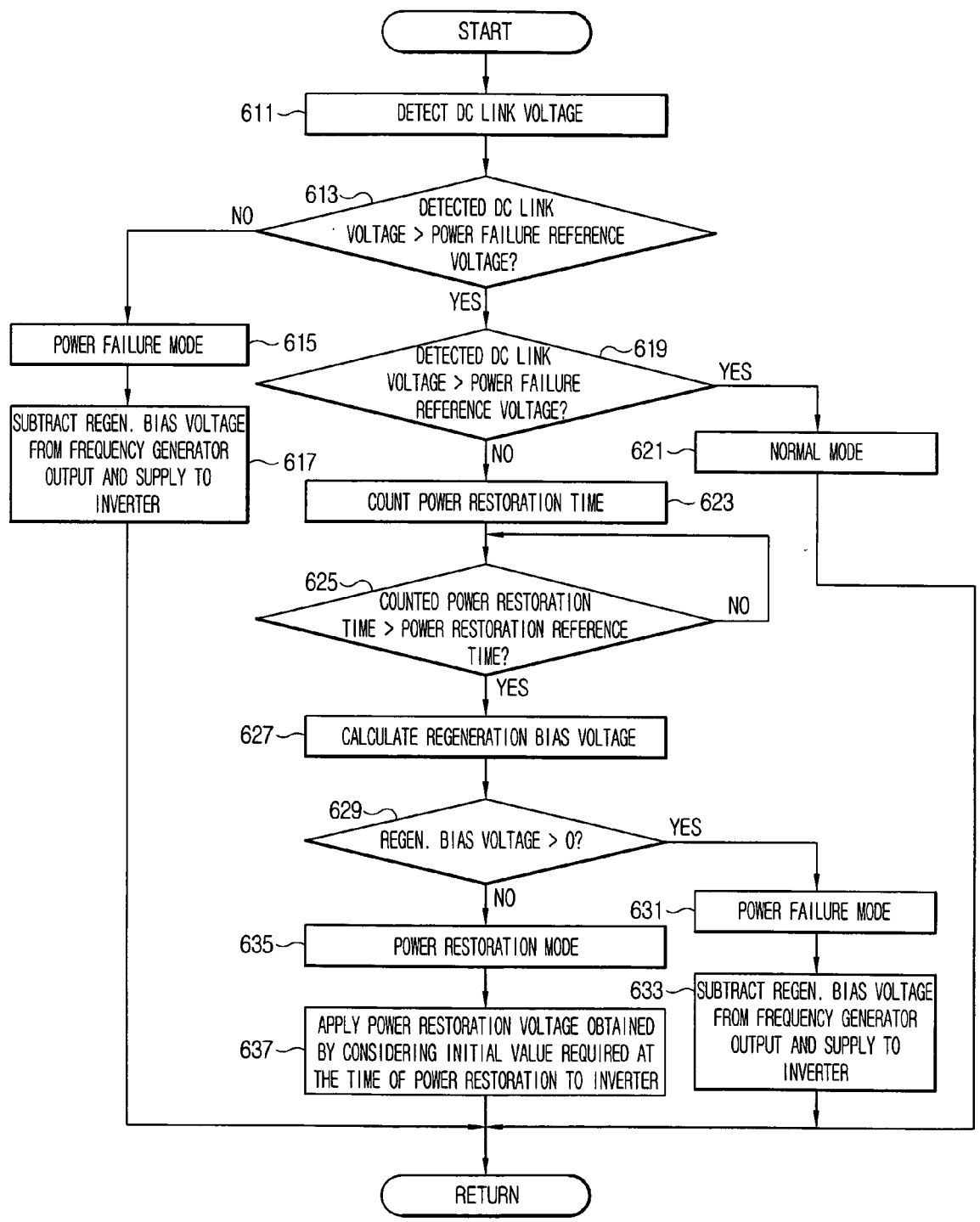
FIG. 6 is a flow chart showing a control method of an inverter system for driving an induction motor according to the embodiment of the present invention.

FIG. 6 is a flow chart showing a control operation of an inverter system for driving an induction motor according to the embodiment of the present invention.

When the control operation is started, the voltage detector 31 firstly detects a DC link voltage from the smoothing circuit 25 in step 611. Thereafter, the routine proceeds to step 613, and the mode determination unit 32 compared the detected DC link voltage with a preset electrostatic reference voltage B.

In step 615, if the detected DC link voltage is smaller than or the same as the preset electrostatic reference voltage B according to the comparison result, the mode determination unit 32 determines the power failure mode.

In step 617, the regeneration bias voltage calculation unit 33 calculates and obtains a regeneration bias voltage on the basis of a difference between the electrostatic reference voltage B and the detected DC link voltage so that the inertial energy of the induction motor IM of the induction motor system can be regenerated by the inverter 11. The subtractor 35 subtracts the obtained regeneration bias voltage from the voltage value of the output pulse voltage signal of the frequency generator 39 to provide the result to the inverter 11. Here, the regeneration bias voltage is obtained by proportional integration of the difference voltage between the preset electrostatic reference voltage and the detected DC link voltage. By outputting to the inverter 11 the obtained voltage for setting the voltage of the inverter 11 to be smaller than the voltage of the induction motor IM, the induction motor IM is able to convert inertial energy into electrical energy after a power failure to be consumed by the inverter 11, and the operation of the inverter 11 also stops after the induction motor IM stops.

In step 613, if the detected DC link voltage is larger than the electrostatic reference voltage according to the comparison result, the routine proceeds to step 619, and the mode determination unit 32 compared the detected DC link voltage with the normal reference voltage D.

If the detected DC link voltage is the same as or larger than the normal reference voltage D according to the comparison result, the mode determination unit 32 determine the normal mode in step 621. At this point, the induction motor IM is normally driven through the inverter 11 only by the output voltage of the frequency generator 39 according to a target frequency in a state that there is not regeneration bias voltage.

In step 619, if the detected DC link voltage is larger than the electrostatic reference voltage B and smaller than the normal reference voltage according to the comparison result, the routine proceeds to step 623, and the timer 34 counts a time (hereinafter, 'power restoration time') during which the detected DC link voltage is larger than the electrostatic reference voltage.

In step 625, the mode determination unit 32 compares whether the counted power restoration time is larger than or the same as a preset power restoration reference time (refer to reference numeral T of FIG. 4).

In step 624, if the counted power restoration time is greater than the preset power restoration reference time, the regeneration bias voltage calculation unit 33 calculates a regeneration bias voltage on the basis of the difference value between the detected DC link voltage and the electrostatic reference voltage.

In step 629, the mode determination unit 32 judges whether the calculated regeneration bias voltage from the regeneration bias voltage calculation unit 33 is larger than 0 (positive number).

If the regeneration bias voltage obtained in step 629 is larger than 0, the mode determination unit 32 determines the power failure mode in step 631. The regeneration bias voltage calculated according to the determination of the mode determination unit 32 is outputted to the subtractor 35, and the subtractor 35 subtracts the regeneration bias voltage from the voltage according to a target frequency from the frequency generator 39 to output the result to the inverter 11. Resultantly, the voltage of the induction motor IM becomes higher than the voltage of the inverter 11, and the inertial energy of the induction motor IM is converted into electrical energy, regenerated by the inverter 11 and consumed in the inverter 11.

If the obtained regeneration bias voltage is not larger than 0 (that is, the regeneration bias voltage is 0), the mode determination unit 32 determines the power restoration mode and gives an order to provide a final voltage command value of the frequency generator 39 in the normal mode right before a power failure, that is, a voltage value according to a final voltage pulse signal, which is stored in the initial value provider 37 in step 635. Accordingly, in step 637, the frequency generator 30 provides the final voltage command value in the normal mode right before the power failure, that is, the voltage value according to the final voltage pulse signal, as a power restoration voltage to the inverter 11 through the subtractor 35. Therefore, the induction motor IM is restarted by the final voltage in the normal mode right before the power failure, thereby rapidly reaching a target speed without lowering the torque and ensuring the continuity of smooth control.

Figure 7A:
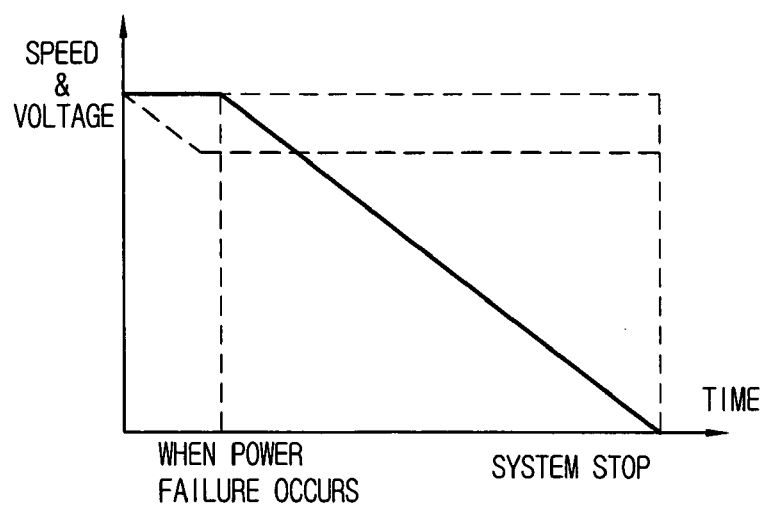
FIG. 7(A) is a first graph showing the result of an experiment performed through a control method of an induction motor system according to the present invention.
Figure 7B:
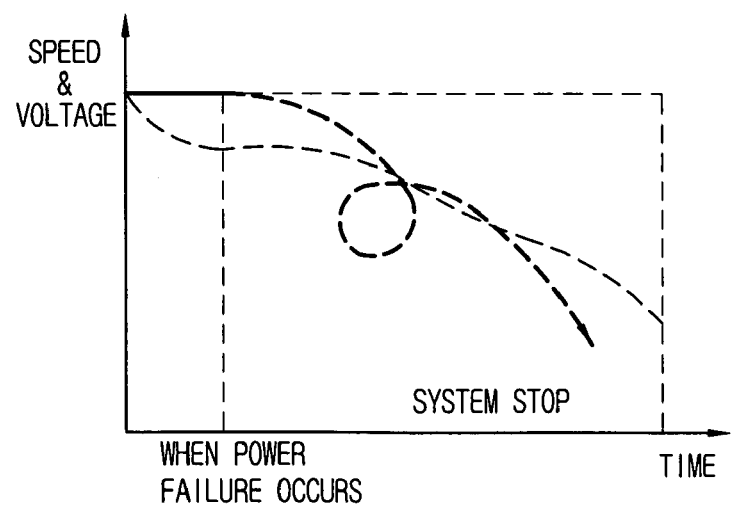
FIG. 7(B) is a first graph showing the result of an experiment performed through a control method of an induction motor system according to the related art.

FIG. 7(A) and FIG. 7(B) are waveform diagrams showing the result of an experiment of connecting the inverter system according to the present invention and the inverter system according to the related art, respectively, to the induction motor.

Here, FIG. 7(A) is a view showing a change in the speed of the induction motor IM and the DC link voltage when a power failure occurs to the induction motor control system applying the inverter system according to the present invention. FIG. 7(B) is a view showing a change in the speed of the induction motor IM and the DC link voltage when a power failure occurs to the induction motor control system applying the inverter system according to the related art.

As depicted in FIG. 7(a), in the induction motor control system according to the present invention, it can be found that when a power failure occurs, the speed â of the induction motor IM gradually decreases linearly and the DC link voltage b̂ maintains a constant level by the regeneration voltage from the induction motor IM. Naturally, the capacitor within the smoothing circuit 25 is discharged after a system stop by which the induction motor IM stops, thereby decreasing the DC link voltage to zero. On the other hand, in the induction motor control system according to the related art, as shown in FIG. 7(b), it can be found that the speed ĉ of the induction motor IM and the DC link voltage d̂ decrease not linearly but irregularly. As shown by the waveform diagram, in the induction motor control system applying the inverter system according to the present invention, the stop control of the motor can be carried out smoothly and the DC link voltage can be maintained for a predetermined time. Subsequently, in case of instantaneous power failure in which power fails instantaneously and then is restored, the power supply voltage of the inverter can be secured rapidly and the control of the motor can be smoothly performed linearly and continuously. On the other hand, in the induction motor control system applying the inverter system according to the related art, it is obvious that the motor stops irregularly and thus, this has an adverse effect to the load driven by the motor. Moreover, as the DC link voltage also sharply decreases, it takes longer for the inverter system according to the related art to restore the power supply voltage at the time of power restoration after the instantaneous power failure than the inverter system of the present invention does, and also it is impossible for it to control the motor linearly and continuously.

As described above in detail, in the inverter system according to the present invention, the operation of the inverter is stopped with the motor being stopped by controlling the inertial energy of the induction motor so as to be regenerated and consumed through the inverter when a power failure occurs, thereby ensuring users' safety.

Furthermore, in the inverter system according to the present invention, in case of power restoration after a temporary instantaneous power failure, the induction motor can be continuously controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. An inverter system for driving an induction motor, comprising:
    a rectifying circuit for rectifying an AC voltage from a three-phase AC power supply and outputting the same;
    a smoothing circuit being connected to the rectifying circuit and for smoothing an output voltage from the rectifying circuit to provide the same;
    a controller for detecting a DC link voltage of the smoothing circuit, determining a power failure mode, a normal mode or a power restoration mode according to the detected DC link voltage and time, determining the normal mode to output a voltage pulse signal according to a target frequency if the detected DC link voltage is higher than or the same as a predetermined normal reference voltage, outputting a voltage pulse signal having a voltage smaller than the voltage according to the target frequency by a regeneration bias voltage obtained by calculation if the detected DC link voltage is the same as or smaller than a predetermined electrostatic reference voltage, and outputting a voltage pulse signal according to the frequency finally outputted and stored at the time of power failure if the detected DC link voltage is higher than the predetermined electrostatic reference voltage and smaller than or the same as the normal reference voltage and when in the power restoration mode in which a predetermined power restoration time has passed; and
    an inverter for driving the induction motor by converting the DC voltage outputted from the smoothing circuit into an AC voltage of variable frequency and variable voltage according to the voltage pulse signal outputted from the controller.

2. The inverter system of claim 1, wherein the controller comprises:
    a voltage detector for detecting the DC link voltage from the smoothing circuit 25 and outputting the detected DC link voltage;

a mode determination unit being connected to the voltage detector and for determining a power failure mode, a normal mode or a power restoration mode according to the DC link voltage from the voltage detector and an elapsed time;

a timer for providing the elapsed time to the mode determination unit;

a frequency generator for providing a voltage pulse signal according to a target frequency on the basis of a preset target frequency, acceleration time and deceleration time;

a regeneration voltage calculation unit for calculating a regeneration bias voltage and providing the same if the mode determination unit determines a power failure mode;

an initial value provider for storing data of a final output voltage pulse signal of the frequency generator if the mode determination unit determine the power failure mode and for providing the frequency generator data of a stored, final output voltage pulse signal as an initial value at the time of power restoration if the mode determination unit determines the power restoration mode; and a subtractor for subtracting the value of the regeneration bias voltage outputted from the regeneration bias voltage calculator from the voltage value of the voltage pulse signal outputted from the frequency generator.

3. The inverter system of claim 2, wherein the regeneration bias voltage calculation unit comprises:

a subtractor for outputting a difference voltage between a preset electrostatic reference voltage and the detected DC link voltage; and a proportional integration controller for outputting a regeneration bias voltage by proportional integration of the output difference voltage.

* * * * *